United States Patent
Mascavage, III (10) Patent No.: US 7,827,101 B2
(45) Date of Patent: Nov. 2, 2010

(54) PAYMENT SYSTEM CLEARING FOR TRANSACTIONS

(75) Inventor: John Joseph Mascavage, III, San Mateo, CA (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 1790 days.

(21) Appl. No.: 10/340,570

(22) Filed: Jan. 10, 2003

(65) Prior Publication Data

US 2004/0139008 A1    Jul. 15, 2004

(51) Int. Cl.
*G06Q 40/00*    (2006.01)

(52) U.S. Cl. ............................... 705/39; 705/40

(58) Field of Classification Search .............. 705/40, 705/65, 39
See application file for complete search history.

(56) References Cited

U.S. PATENT DOCUMENTS

| | | |
|---|---|---|
| 5,699,528 A | 12/1997 | Hogan |
| 5,745,886 A | 4/1998 | Rosen |
| 5,757,917 A | 5/1998 | Rosen et al. |
| 5,826,241 A | 10/1998 | Stein et al. |
| 5,899,980 A | 5/1999 | Wilf et al. |
| 5,909,492 A | 6/1999 | Payne et al. |
| 5,920,629 A | 7/1999 | Rosen |
| 5,949,044 A | 9/1999 | Walker et al. |
| 6,029,150 A | 2/2000 | Kravitz |
| 6,032,133 A | 2/2000 | Hilt et al. |
| 6,070,798 A | 6/2000 | Nethery |
| 6,078,907 A | 6/2000 | Lamm |
| 6,098,053 A | 8/2000 | Slater |
| 6,119,106 A | 9/2000 | Mersky et al. |
| 6,122,625 A | 9/2000 | Rosen |
| 6,128,603 A | 10/2000 | Dent et al. |
| 6,131,811 A | 10/2000 | Gangi |
| 6,189,787 B1 | 2/2001 | Dorf |
| 6,246,996 B1 | 6/2001 | Stein et al. |
| 6,263,446 B1 | 7/2001 | Kausik et al. |
| 6,263,447 B1 | 7/2001 | French et al. |

(Continued)

FOREIGN PATENT DOCUMENTS

EP    0 949 596 A2    10/1999

(Continued)

OTHER PUBLICATIONS

Mastercard International, *Secure Payment Application (SPA)*, downloaded from website http://www.mastercardintl.com.

(Continued)

*Primary Examiner*—Richard C Weisberger
(74) *Attorney, Agent, or Firm*—Townsend and Townsend and Crew LLP (57) ABSTRACT

According to the invention, a method for a payor paying a merchant using a payment system is disclosed. In one step, account information is received that can be used for receiving funds using a money handler. The account information identifies an account of the payor. A token is generated that correlates to the account information. The token is sent to the merchant that uniquely identifies the payor and the merchant. The token, which corresponds to a payment, is received. It is authenticated that the token was presented by the merchant. The payment is transferred from the payor to the merchant with the payment system.

12 Claims, 8 Drawing Sheets

U.S. PATENT DOCUMENTS

| | | | |
|---|---|---|---|
| 6,282,658 B2 | 8/2001 | French et al. | |
| 6,321,339 B1 | 11/2001 | French et al. | |
| 6,349,290 B1 * | 2/2002 | Horowitz et al. | 705/35 |
| 6,360,254 B1 | 3/2002 | Linden et al. | |
| 6,938,019 B1 * | 8/2005 | Uzo | 705/65 |
| 7,103,575 B1 * | 9/2006 | Linehan | 705/64 |
| 7,415,443 B2 * | 8/2008 | Hobson et al. | 705/65 |
| 2002/0139849 A1 | 10/2002 | Gangi | |
| 2003/0061170 A1 * | 3/2003 | Uzo | 705/64 |
| 2003/0187787 A1 * | 10/2003 | Freund | 705/39 |
| 2004/0255143 A1 * | 12/2004 | Wemyss et al. | 713/200 |

FOREIGN PATENT DOCUMENTS

| | | |
|---|---|---|
| EP | 1 077 436 A2 | 2/2001 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/79452 A2 | 12/2000 |
| WO | WO 02/05195 A1 | 1/2002 |

OTHER PUBLICATIONS

Confinity, Inc., PayPal.com, How PayPal.com Works, downloaded from website http://www.paypal.com/ on Feb. 7, 2000.

Idealab Company, PayMe.com, downloaded from website https://ssl.idealab.com/ on Feb. 16, 2000.

X.Com, *Do More with Your Money*, downloaded from website http://www.x.com.

Dotbank, *The Way to Send and receive Money on the Internet*, downloaded from website http://www.dotbank.com.

Transpoint, *The Way to Pay Online*, downloaded from website http://www.transpoint.com/ on Feb. 10, 2000.

\* cited by examiner

PAYMENT SYSTEM CLEARING FOR TRANSACTIONS

BACKGROUND OF THE INVENTION

The invention relates generally to payment systems, and more particularly relates to transferring money between parties.

One party may wish to transfer money to herself, a counter party, or vice versa, for any of a variety of reasons. Frequently, a payor party owes a debt to a payee party or is purchasing something from a payee party. These purchases could be performed online or in-person at a point of sale (POS) terminal. A consumer typically carries a number of payment sources such as checks and cards to use in these purchases. During checkout, the consumer enters information from the check or card to allow transfer. POS terminals allow entering some of this information in an automated fashion using, for example, a check reader, a bar code reader, a magnetic stripe reader, a smart card reader, or a RFID reader.

In some cases, automated terminals gather some information from cards in an automated way. For example, airport kiosks allow entering a credit card with a magnetic stripe to read the name of the passenger to initiate a process for issuing a boarding pass. The passenger may also be able to enter this information with a keyboard.

There are electronic wallets available online to ease the checkout process. These electronic wallets store card information and demographic information that could be used to purchase items in an online checkout process. The consumer manually enters this information into the electronic which serves as a repository. The card information includes the card number, accountholder name, expiration date, etc. associated with the account. Some online merchants are configured to automatically pull the information from the electronic wallet needed to complete the transaction. The online merchant can store the information from the electronic wallet for future purchases.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a system for a payor paying a merchant. Included in the system are a payment enabler, a money handler interface, a user interface, and a token. The payment enabler receives account information for receiving funds using a money handler. The account information identifies an account of the payor. The user interface receives account information. The payor and the merchant are uniquely identified by the token, which can also be correlated to the account information. The token is sent to the merchant and later returned to the payment enabler to clear a payment. A check of the returned token is performed before transferring the payment from the payor to the merchant with the payment system.

In another embodiment, the present invention provides a method for detecting transfer requests that could be fraudulent. In one step, account information is received that can be used for receiving funds using a money handler. The account information identifies an account of the payor. A token is generated for a merchant that is one of a plurality of merchants. The token correlates to the account information. The token is sent to the merchant. The token uniquely identifies the payor and the merchant. The token corresponding to a payment is received. It is determined that the token was presented by a party other than the merchant. Transfer of the payment to the party is prevented.

In yet another embodiment, the present invention provides a method for a payor paying a merchant using a payment system. In one step, account information is received that can be used for receiving funds using a money handler. The account information identifies an account of the payor. A token is generated that correlates to the account information. The token is sent to the merchant that uniquely identifies the payor and the merchant. The token, which corresponds to a payment, is received. It is authenticated that the token was presented by the merchant. The payment is transferred from the payor to the merchant with the payment system.

Figure 1:
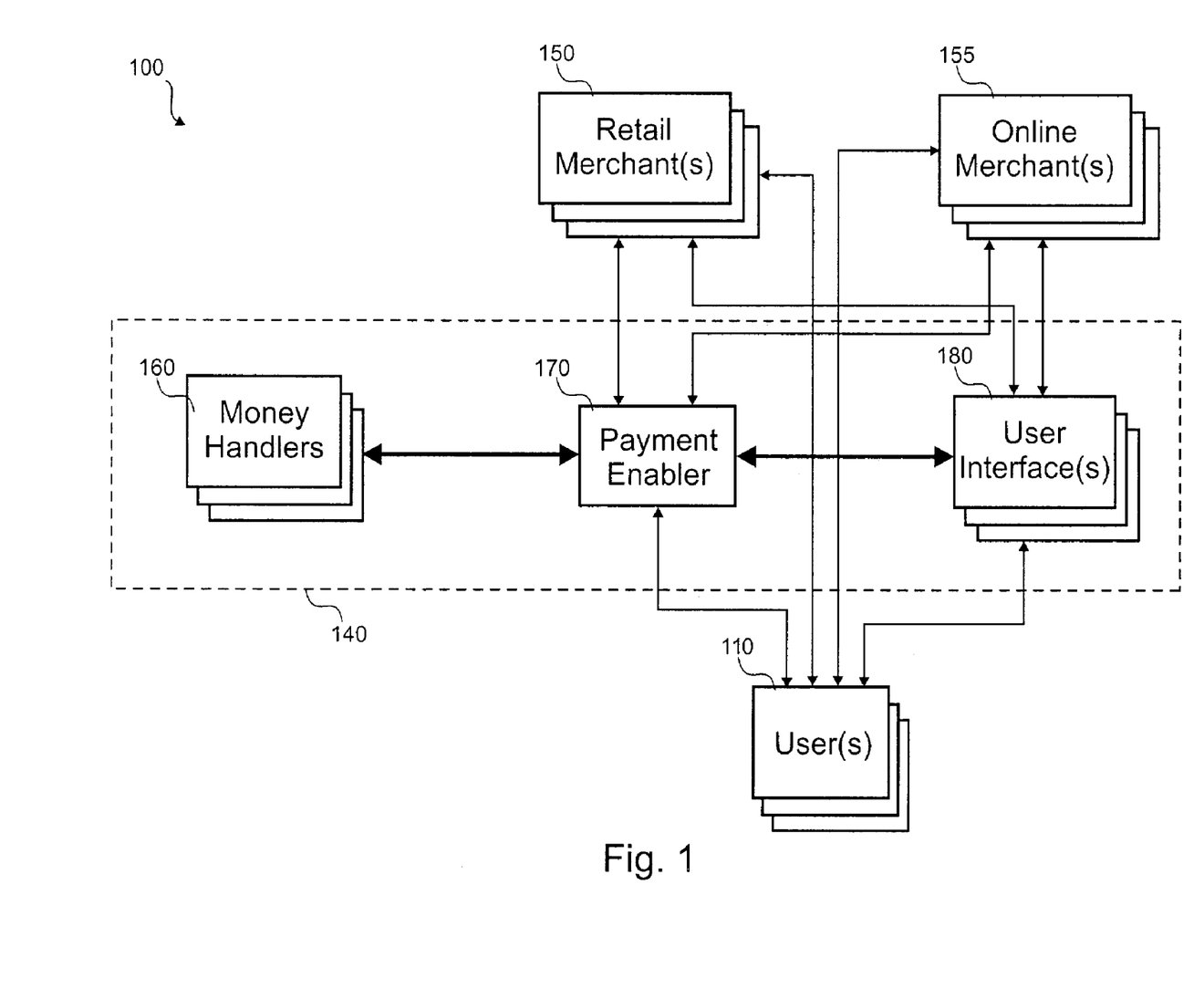
FIG. 1 is a block diagram of an embodiment of a money transfer system.

Initially referring to FIG. 1, a block diagram of an embodiment of a money transfer system 100 is shown. Included in the money transfer system 100 are retail merchants 150, online merchants 155, a payment system 140, and users 110. In a typical transaction, a user 110 is transferring payment with the payment system 140 to a retail or an online merchant 150, 155 as part of an online or in-person checkout process. Any number of users 110 can use the payment system 140 to transfer money to the various merchants 150, 155.

In this embodiment, there are both retail and online merchants 150, 155 that the user 110 can transfer money to with the payment system 140. The retail merchants 150 typically have storefronts that the user 110 visits to make a purchase. A point of sale (POS) terminal is used to manage the transfer of payment to the retail merchant 150. With online merchants 155, the user 110 interacts with an electronic interface to the online merchant 155. For example, the user 110 pulls up a screen from the online merchant 115 that allows selection of items for sale and entry of payment information.

The payment system 140 effectuates transfers between the users 110 and the merchants 150, 155. Included in the payment system 140 are a payment enabler 170, money handlers 160, and user interfaces 180. After choosing the items for purchase, users 110 and merchants 150, 155 primarily interface with the payment enabler 170 through the user interfaces 180 with information provided by the payment enabler 170. Once the transaction is configured for execution, the payment enabler 170 interacts with money handlers to effectuate the transfer. The payment enabler 170 tracks the transfers and allows the user 110 and merchant 150, 155 to receive status information on accounts and transfers.

The user interfaces 180 allow a multitude of ways for interaction with the payment enabler 170. In various embodiments, the user and merchant 110, 150, 155 can interact with a computer, a phone, a POS terminal, etc. to communicate with the payment enabler 170. The user 110 configures an account with the merchant 150, 155, enters handler information for one or more money handlers 160, configures transfers, and gathers status information using any of the possible user interfaces 180. The merchant 150, 155 passes gathered information to the payment enabler 170 and receives one or more tokens that are used to clear payments through the payment system 140.

The money handlers 160 are various entities that accept credits or debits on behalf of users 110 and merchants 150, 155. Typically, the account with a particular money handler 160 is created separately. For example, a merchant 150, 155 would typically have an account with a bank handler and a user 110 would have a credit card handler for a purchase by the user 110 using a credit card. In addition to accepting credits and debits, the money handlers 160 may participate in authentication, provide status information on an account, and provide clearing status for transactions.

In other embodiments, the user 110 could transfer money for any purpose to a payee in an online transaction rather than to a merchant 150, 155. Further, the roles of the parties could be reverse to send money to the users 110. FIG. 1 shows interconnection between the various blocks, but those connections could be direct connections or virtual connections through a network. Further, the various blocks could have their functionality combined or separated in various embodiments.

Figure 2:
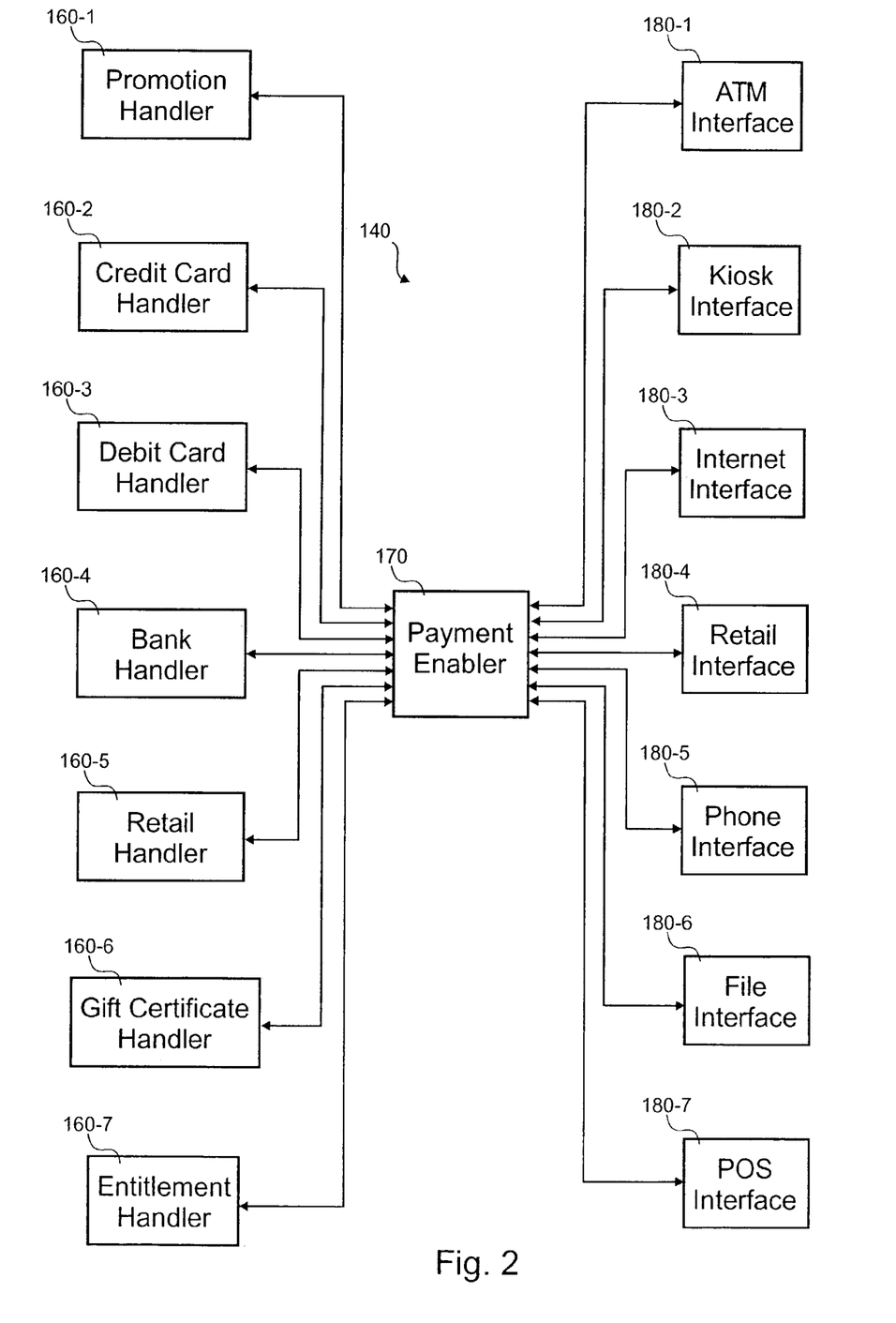
FIG. 2 is a block diagram of an embodiment of a payment system.

With reference to FIG. 2, a block diagram of an embodiment of a payment system 140 is shown. In this embodiment, seven money handlers 160 and seven user interfaces 180 are shown. Other embodiments could have more or less handlers 160 and interfaces 180. Each of the money handlers 160 allows a payor or payee 110, 130 to add and/or remove money from the payment enabler 170. Normally, the payor 110 chooses the handler 160 to fund the transaction and the payee 150, 155 chooses the handler 160 that receives the transfer. The user interfaces 180 allow a variety of interaction with the payment enabler 170 to fund a payment or to transfer money to and from a stored value fund of the payment system 140.

In many cases, the user 110 interacts with the interface 180 to communicate with the merchant 150, 155 and payment enabler 170. From the perspective of the user 110 the interaction with the payment enabler 170 could be seamless with the interaction with the merchant 150, 155. For example, the payment enabler screens could be branded with the merchant logos and trade dress. Some embodiments could accentuate that the separate payment enabler 170 were being interfaced with logos and trade dress of the payment enabler 170.

A promotion handler 160-1 allows adding and removing money in a form other than legal tender or a negotiable instrument. Examples of promotion handlers 160-1 include airline mileage programs and prepaid phone cards. For example, a user 10 could use money in a stored value fund of the user to purchase airline miles with an airline mileage handler 160-1 or miles could be transferred from a user 110 to a merchant 150, 155 to buy something. A conversion rate would be applied to convert between money and mileage credit. The payment enabler 170 would store any special information for interacting with the promotion handler 160-1, such as the user's promotion account number, password, etc.

Credit and debit card handlers 160-2, 160-3 largely behave the same from the perspective of the user 110 and merchant 150, 155. Both can be used to add money into the payment enabler 170 for a merchant payment or a stored value fund to hold. In other embodiments, these handlers 160-2, 160-3 can also be used to remove money from the payment enabler 170, for example, to purchase a prepaid credit/debit card, to pay down a balance on a credit card, or to add credit to a bank account associated with a debit card. To use the credit and debit card handlers 160-2, 160-3, the payment enabler 170 stores the information for receiving money from credit or debit cards in the conventional way, such as the account number, expiration date, name, and/or PIN. Similar information may be used when paying-out money to a credit/debit card.

There are different ways to authenticate a debit card with the debit card handler 160-3. The PIN could be stored with the payment enabler 170 for use when the user 110 satisfactorily authenticates their identity to the payment enabler 170 with another PIN, a password, biometric information, etc. The PIN could be collected from the user 110 during each checkout process and passed to the debit card handler 160-3 to verify authentication. In some embodiments, the payment enabler 170 could authenticate the user 110 and merely notify the debit card handler of that authentication for the debit to be accepted by the debit card handler 160-3 without passing the actual PIN to the handler 160-3.

A bank handler 160-4 allows electronic funds transfer (EFT) of money to a bank account or brokerage account of the user 110 and/or merchant 150, 155. An account holder 110, 150, 155 of the payment enabler 170 enters the account number and routing information into the payment enabler 170 with a user interface 180 to facilitate adding and removing of money from the payment enabler 170 with this handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as a retail interface 180-4 for interacting with the payment enabler 170. Some embodiments could wire money into a bank account of the account holder instead of an EFT.

A retail handler 160-5 typically corresponds to a retail location or a system of linked retail locations that may wire money, print money orders and/or cash checks. Money may be sent to the retail handler 160-5, whereafter the user 130 is issued cash or a negotiable instrument for that money. Money can be added to the system 100 by the retail handler 160-5 also. For example, the user 110 may give cash, use a card, write a check to an agent who enters a credit into the payment enabler 170. The payor 110 could further specify a payee 150, 155 to the agent who should get the money along with any information on a destination account of the payee 150, 155 that might be known to the payor 10. A retail interface 180-4 at the retail location is used by the agent to indicate to the payment enabler 170 that the money has been received from or by the user 110, 130. Through a retail handler 160-5, a payor 110 could use the money transfer system 100 without any knowledge of computers or without any debit/credit card or bank account.

Some embodiments could also include a billing handler (not shown). The billing handler is a party that would bill the user 10 for any amount due. Typically, the billing handler has a previous business relationship with the user 110 for which billing is done on a regular basis. For example, the billing handler could be a phone company that would allow additions to the periodic billing statements sent to the user 110. The additional amounts added to the bill would correspond to purchases by the user 110. In some cases, credits from the payment system 140 could be used to paydown any balance on the periodic bill. Where a positive balance were achieved from credits, the billing handler could issue a check with their periodic billing statement.

Gift certificates are dispensed and redeemed with one or more gift certificate handlers 160-6. The gift certificate can be limited to merchandise and/or services from a single merchant 150, 155 or a group of merchants 150, 155. In some cases, the gift certificate is used online by entering a code unique to the gift certificate or could be printed for use with a retail merchant 150. Multi-store gift certificates such as Flooz™, formerly available from Flooz.com, could also be provided to an account holder.

An entitlement handler 160-7 can support third party payment for a percentage of purchases and/or certain types of purchases. The entitlement handler 160-7 could support programs like food stamps where certain types of products can be purchased by program participants with the government paying the merchant. In some embodiments, the entitlement handler 160-7 could pay a percentage of the items purchased. Where a product or percentage of product is not compensated by the entitlement handler 160-7, a secondary handler can be specified to pay for that product or percentage of a product.

As briefly discussed above, the ATM interface 180-1 allows interaction with the payment enabler 170. The account holder may or may not have an affiliation with the ATM that is used to interface with the payment enabler 170. Where there is no affiliation, the owner of the ATM may charge the user a fee for this service. The account holder can receive cash or deposit cash if the ATM is coupled to a bank handler 160-4. In any event, the ATM interface 180-1 can be used to interface with the payment enabler 170 in the same way an account holder may interact through a web browser and computer with the payment enabler 170. If the ATM interface has a magnetic stripe or smart card reader, this could be used by to avoid entering credit or debit card information manually for the payment enabler 170. Further a biometric scanner could be used to allow authentication of the account holder or to gather a evidentiary record of who authorized the transaction.

A kiosk interface 180-2 allows an account holder to also interact with the payment enabler 170, but does not allow adding or removing cash in this embodiment. The kiosk interface 180-2 may be a browser terminal available for general use. Some embodiments may include a check or money order printer for removing money from the system 100. Further, some kiosk interfaces 180-2 could include a card reader or a biometric reader. The kiosk interface 180-2 could be in a retail location and linked to the other systems in the retail location such that a payout could be provided by other systems in the retail location. For example, the agent could access the payment enabler 170 with a retail interface 180-3 to remove funds that are disbursed to the payee 150, 155 from a cash register.

An Internet interface 180-3 is typically implemented through a web browser or some other application software. The browser downloads web pages from the payment enabler 170. The Internet interface could be hosted by the computer of an account holder or any computer that can display web pages. Some embodiments could host the Internet interface on a portable device such as a wireless phone or personal digital assistant (PDA). The Internet interface 180-3 may also be used by the ATM, kiosk, retail, POS interfaces 180-1, 180-2, 180-4, 180-7 in whole or in part. The Internet interface 180-3 uses encryption for the link to the payment enabler 170 in some embodiments. Other embodiments may not have a web interface, using application software instead to interact with the payment enabler 170.

The retail interface 180-4 allows for specialized interaction by an agent at the retail location 125. Agents typically have special training and offer enhanced services over most interfaces 180 and handlers 160. The agent can move money between payors 110 and payees 150, 155. Also, the agent can pay-in and pay-out money from the online transfer system 100 or configure transfers between account holders. Files from removable media can be read into the system by the agent using the file interface 180-6. The retail interface 180-4 allows an agent to act on behalf of an account holder when manipulating his or her account. For security, the password or PIN of the account may be entered by the account holder during this manipulation on a private keypad or terminal. Further, the agent may verify the identity of the payee 150, 155 before disbursing the funds. In one embodiment, a test question is provided by the payor 110 that the payee 150, 155 must answer before the electronic gift is paid-out. Alternatively, the payee 150, 155 could confirm some not easily discernable information such as the maiden name of someone, a place of birth, a social security number, etc. A biometric reader could be also used on the payee 150, 155.

Interaction with the payment enabler 170 may also be performed over a telephone interfaced to the plain-old telephone system (POTS). The phone interface 180-5 provides voice prompts and recognizes the user's touch-tone or speech recognized input. Enhanced interaction with the phone interface 180-5 could be provided with wireless phones, smart phones or VOIP phones having wireless access protocol (WAP) and/or graphical user interfaces (GUIs).

The payment enabler 170 can receive and send files that list information related one or more transfers. These files are transferred from the various account holders in a secure manner that authenticates the sender and prevents unauthorized modification. The files could be transferred using standard file transfer protocol (FTP) protected by secure sockets layer (SSL) or other ways. Other embodiments could encrypt the files using an encryption algorithm such as DSA with 512-bit keying. The received files could initiate transfers or request status of existing transfers. The sent files could provide status information on transfers. In this embodiment, the merchant 150, 155 presents a token associated with the user to the payment enabler 170 when clearing transactions.

POS interface 180-7 is used with retail merchants 150 as part of the checkout process. This interface 180-7 connects to the payment enabler 170 who formulates screens that the user 110 can interact with. In a typical situation, the user 110 would wait in a checkout line before a clerk determines what is owed for the selected items. A POS terminal could read a smart card, magnetic stripe, check, bar code, RFID tag or other machine readable medium to accept credit and debit cards and checks. This POS terminal could have a screen that provides instructions and confirms entries. In some cases, an existing machine readable medium registered with the payment enabler 170 or that includes information on the user could be read to ease access to the payment enabler 170 as a keyboard is typically not available, but could be available in some embodiments. Further, the POS terminal could include one or more biometric readers to determine or verify the identity of the user 110 or to store biometric information if there is a question as to the true identity of the user 110.

Figure 3:
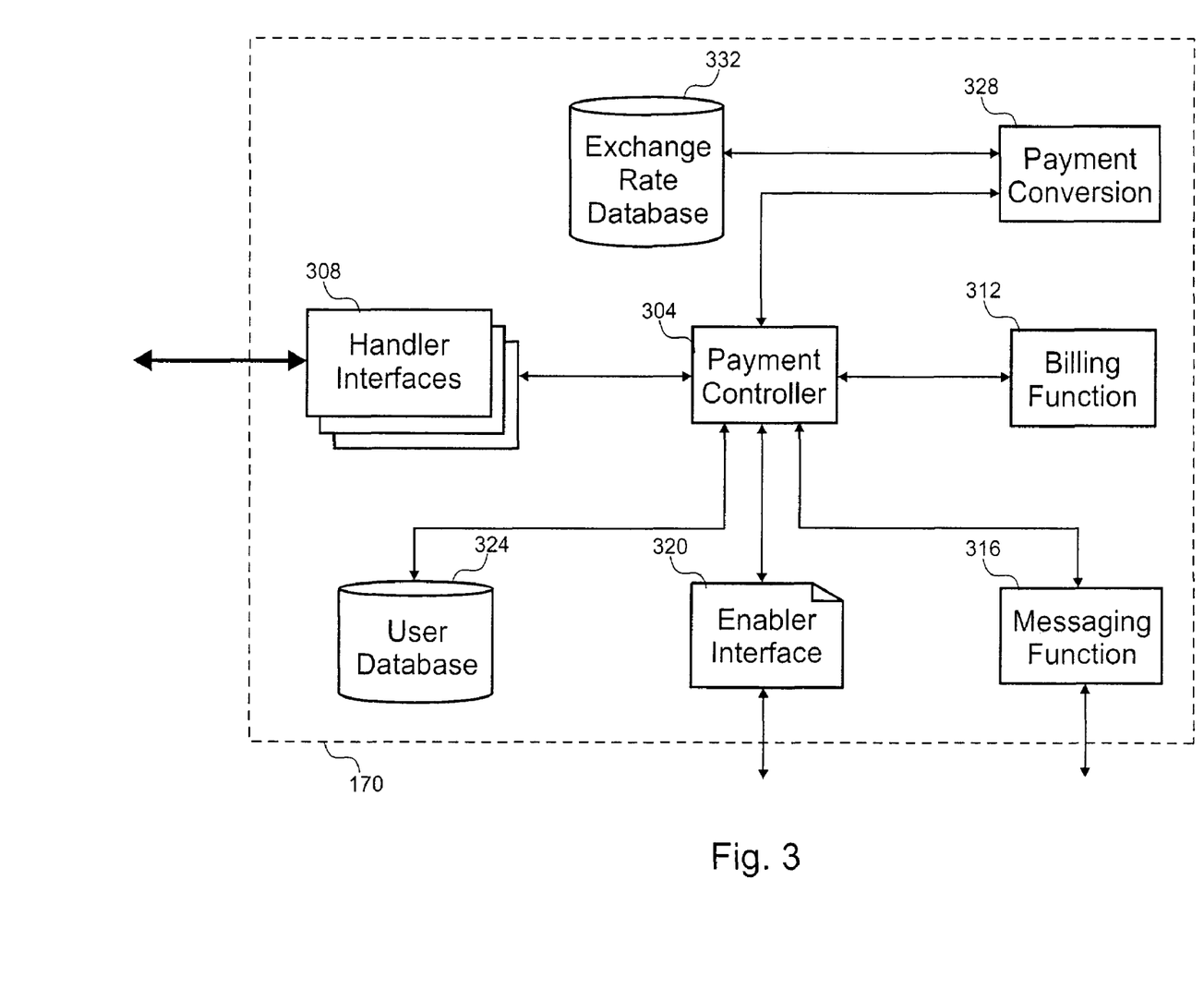
FIG. 3 is a block diagram of an embodiment of a payment enabler.

Referring to FIG. 3, a block diagram of an embodiment of a payment enabler 170 is shown. The transfer of money between handlers 160, stored value funds and account holders 110, 150, 155 is controlled by the payment enabler 170 in this embodiment. The payment enabler 170 may be implemented on one or more computers in one or more locations where the various computers would communicate over a network of some sort. Included in the payment enabler 170 are a payment controller 304, handler interfaces 308, a billing function 312, a messaging function 316, an enabler interface 320, a user database 324, a payment conversion function 328, and an exchange rate database 332.

The payment controller 304 manages operation of the payment enabler 170. The handlers 160 and interfaces 180 along with account holder information and money conversion tasks are all choreographed by the payment controller 304. Authorization of a transfer and authentication of an account holder are performed and recorded under the guidance of the payment controller 304. The payment controller 304 is interconnected to the other portions of the payment enabler 170 by one or more networks.

The payment conversion function 328 allows converting between disparate forms of money as it is transferred through the money transfer system 100. An exchange rate database 332 holds conversion factors that allow determining the proper weight to give one form of money with respect to the others. In one example, the payment conversion function 328 may convert money in U.S. dollars to money in European Union Euros. In another example, a user may convert money into airline miles of eight miles for every dollar for a promotion handler 160-1. The exchange rate database 332 is updated with conversion rates as often as practical to track changes in currency values. The conversion rate may accommodate a percentage service fee for the exchange, or a flat fee could be charged instead of a conversion rate. In some embodiments, the conversion rate incorporates a service fee.

The billing function 312 monitors and charges for the services of the payment enabler 170. There may be charges when transferring money, converting money, redirecting a transfer, opening accounts, using customer service, sending electronic gifts, printing and mailing negotiable instruments, using kiosks, ATMs or retail locations, etc. These charges are deducted from a transfer in this embodiment, but other embodiments could charge monthly fees or charge a fee to the payor 110 and/or payee 150, 155 in addition to the amount transferred. Some embodiments could recover a fee from the handler 160, for example, a fee could be charged to the gift certificate target store instead of charging the payor 110. The different types of handlers 160 may have different fees associated with them. For example, a credit card may have a three percent charge, but a bank transfer may only have a one percent charge. The payor 110 and/or the payee 130 can be charged to transfer money between themselves. The transfer in or out of the system 100 may incur a separate charge. The billing function 312 may issue, or otherwise make available, invoices for some account holders 110, 150, 155.

The billing function 312 also tracks the costs, discount and promotions available from the money handlers 160. The user 110 and/or merchants 150, 155 can prioritize the order at which various handler accounts are presented. Conflicting preferences may be resolved in favor of either the user 110 or merchant 150, 155 in various embodiments. In some cases, the presentment of some options are completely eliminated. For example, a particular merchant 150, 155 may accept payment from the payment enabler 170 so long as a credit card handler 160-2 is not used such that the option of using a credit card is not presented to the user 110 during checkout.

There are handler interfaces 308 to support the various types of handlers 160. Each of these interfaces 308 may support a single handler 160 or a group of handlers. For example, a single interface 308 may perform EFT both to and from all bank handlers 160. When money is sent to or received from a handler 160, the appropriate handler interface 308 passes the money and transfer information to the payment controller 304. In some embodiments, the cost of the transfer to or from the handler 160 is reported by the handler interface 308 such that the billing function can recover those costs.

Information for the account holders of the system 100 is stored in the user database 324. This information includes an address book of other account holders, money credit in any stored value fund of the account holder, past money transfer information, account number, e-mail addresses, demographic information, handler interface information, handler preference information, merchant relationship information, etc. In this embodiment, the demographic information includes name, address, phone number(s), a government issued identification number such as a social security number, and other information. Any money credit not transferred out of the system 100 is stored in a stored value account or a trust account for the benefit of the user 110 according to the entry in the user database 324 corresponding to that user and interest may or may not be paid on that money credit.

The user 110 has account information for one or more of the various merchants 150, 155 that use the payment enabler 170 stored in the user database 324. In this embodiment, the payment enabler 170 issues a token for each merchant 150, 155 that the user 110 has a relationship with. Each merchant could even have a number of tokens for a user 110 that correspond to the various handler accounts available to the user 110 when paying. The user database information can be accessed with the token to effectuate the payment through the handler 160.

The user 110 may or may not have configured an account with the payment enabler 170. Some embodiments create an account for the user 110 specific to that merchant without requiring the user 110 to log into the payment enabler 170. Where a user 110 has a number of merchant-specific accounts, the payment enabler could associate those with a single account if the user 110 can be positively identified. Where the user 110 has created an account with the payment enabler 170, the user 110 can login to manipulate their account. For example, the user 110 can view the active tokens for the various merchants 150, 155 and cancel any of those tokens.

The enabler interface 320 is used by the various interfaces 180 to interact with an account holder or their agent. The enabler interface 320 allows the user 110, 130 to create and maintain their account, transfer money, configure handlers, and learn to use the system 100. The appropriate user interface 180 formats and processes the enabler interface information according to the device used to interface with the payment enabler 170. In other words, the various handler interfaces 180 interact with the enabler interface 320 to translate information suitable for the particular handler interface 180. For example, the enabler interfaces may want certain demographic information to create an account that the phone interface 180-5 would convert to verbal questions. In another example, the Internet interface 180-3 takes the information from the enabler interface 320 and formats into hypertext mark-up language (HTML) appropriate for the web browser of the account holder 110, 150, 155.

A messaging function 316 is used with some configurations to optionally notify the account holders 110, 150, 155 of certain events. Status, acknowledgment and billing messages are sent by the messaging function 316. For example, a transfer not clearing could be sent to the payor 110 such that another payment option could be used to fund the transfer. These messages could be accessed using a web browser, an e-mail program, an instant messaging program, a voice mail system, a pager, a WAP enabled device, etc. In some embodiments, the messaging function 316 may issue printed bills and statements for users 110, 130. The messaging function 316 is also used to communicate with retail locations in various embodiments.

Figure 4:
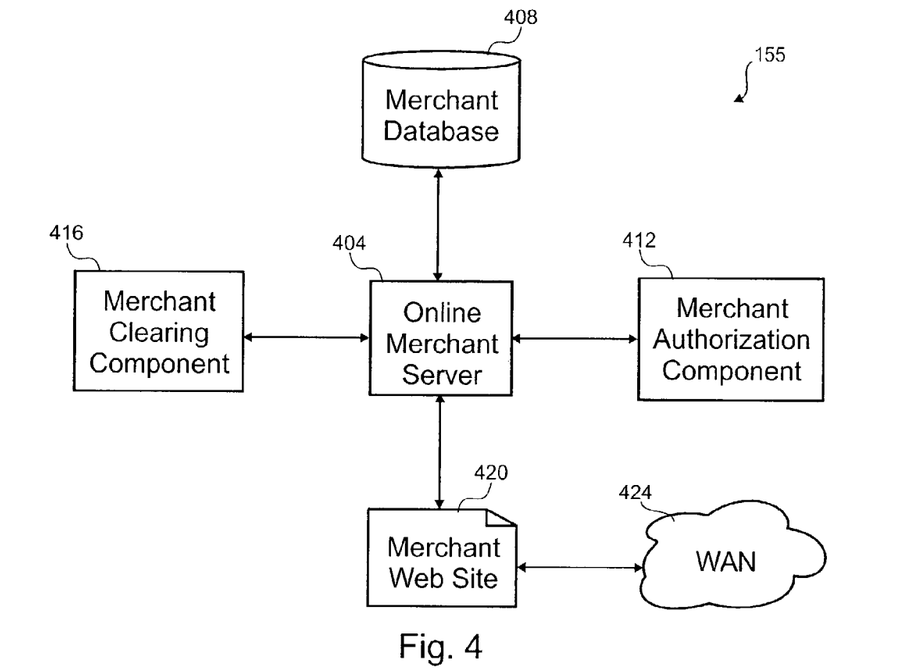
FIG. 4 is a block diagram of an embodiment of an online merchant.

With reference to FIG. 4, a block diagram of an embodiment of the online merchant system 155 is shown. An online merchant server 404, which could include one or more computers, manages operation of the merchant system 155. A merchant web site 420 runs on the online merchant server 404. Users interact with the merchant web site 420 by way of a wide area network (WAN) 424 to select goods and/or services for purchase. Those skilled in the art appreciate that the merchant server 404 could be one or more computers located in one or more locations where those computers are interconnected by some sort of network. Also, some blocks of the diagram could be combined into one as those skilled in the art appreciate. Further, other components of these and other blocks diagrams described in this specification could be so divided or combined.

The merchant web site 420 interfaces with a merchant authorization component 412 and a merchant clearing component 416 to integrate the functionality of the merchant system with the payment system 140. The merchant authorization component 412 communicates with the payment enabler 140 using the proper format, tokens, protocol, encryption and digital signatures during the authentication process where a payor 110 authorizes payment with the payment enabler 170. Communication during the clearing process is facilitated by the merchant clearing component 416 in a similar way. More specifically, the merchant clearing component 416 transports clearing files to the payment enabler 170 and receives settlement files from the payment enabler. Instead of passing files, the merchant can log into the payment enabler 170 or the merchant clearing component 416 can make automated queries on individual transactions.

Depending upon a business model of the online merchant 155, various information is stored in a merchant database 408. In this embodiment, digital IOUs, shipping addresses, user names, user passwords, past invoices, tokens, shipping status, and payment status is stored in the database 408. This embodiment does not store account information related to accessing money handlers 160 in the merchant database 408. Any account information gathered by the merchant 155 is exchanged by the payment enabler 170 for a token that is stored in the merchant database 408. The payment status information may indicate where in the settlement process is a particular payment. For example, the payment status may indicate that a digital IOU was issued two days ago, a clearing file was submitted yesterday that presented a certain portion of the digital IOU and a settlement file today indicated the EFT had cleared that portion. In some circumstances, the merchant may wait for the EFT funds to clear before sending the goods and/or providing service to the user 110.

Figure 5:
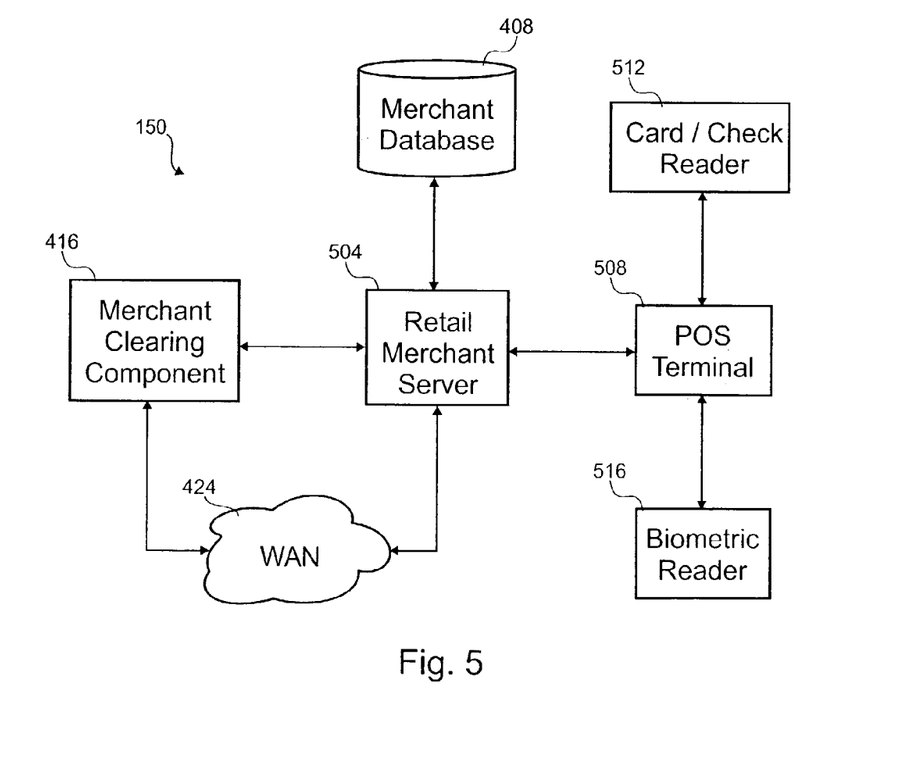
FIG. 5 is a block diagram of an embodiment of a retail merchant.

Referring next to FIG. 5, a block diagram of an embodiment of an retail merchant 150 is shown. The retail merchant 150 includes a retail merchant server 504, the merchant clearing component 416, the merchant database, a POS terminal 508, a card/check reader 512, and a biometric reader 516. Retail merchants 150 typically include the POS terminals 508 to aid in checkout, but there is no reason why an online merchant 155 couldn't work with a POS terminal that is coupled to the online merchant 155.

A store clerk typically operates a cash register that is coupled to the POS terminal 508. The user 110 typically interacts with the POS terminal to effectuate payment. Communication between the POS terminal 508 and the payment enabler 170 is relayed by the retail merchant server 504 through the WAN 424. The screens on the POS terminal 508 are formulated by the payment enabler 170 and/or the POS terminal 508 itself.

Information gathered by the card/check reader 512 and the biometric reader 516 is processed by the POS terminal 508 and relayed back to the payment enabler 170 for further analysis. The card/check reader 512 can read account and routing information from checks and account information from cards. The card could have a one- or two-dimensional bar code, a magnetic stripe, a smart card chip, and/or a RF ID tag. In some cases, the card provides an account number that is used to retrieve other information from the payment enabler 170. For example, the card could include a user name or code representation of one to the card/check reader 512 that is passed to the payment enabler 170. Some embodiments could allow any card or check registered with the payment enabler 170 that is read to identify the user 110.

Once the user 110 is known to the money transfer system 100, that purported identity can be further verified. This embodiment uses a biometric reader to assist in this process. The biometric reader could read any portion of the user to confirm the purported identity by checking the biometric data against information stored in the user database 324. Some embodiments could use a soft keypad on the screen of the POS terminal 508 to allow entry of a PIN to confirm the purported identity of the user 110. Further, the POS terminal screen could allow entry of a signature on its screen that is processed to confirm identity.

In some cases, the possession of the card or check is the only authentication performed, but the biometric reader or the electronic screen signature could be stored in the user database 324. The biometric scan or signature could be used where the charge is later disputed. Where only one form of payment, such as a check or card, is presented and/or the user 110 is not registered with the payment enabler 170, a transfer could be limited to that form of payment for that transaction. Other embodiments could allow access to other accounts stored in the payment enabler 170 once the existence of one form of payment is demonstrated.

After the merchant 150 has authenticated the user 110, the token is relayed to the payment enabler 170 to clear the payment. Where there is no token stored in the merchant database, the merchant can request one from the payment enabler 170. Information is passed to the payment enabler 170 to create or access a payment enabler account. The user 110 can limit the use of the token to time periods, purchase amounts, purchase of certain products and/or classes or products, for example. The time periods could be time of day, a range of dates, an expiration, etc. Limits on the purchases could include limit on the amount per transaction, the amount over a time period or a cumulative amount to not exceed. For example, the token could be valid for the next 90 days with no more than $100 per week available for sporting goods purchases only.

Figure 6:
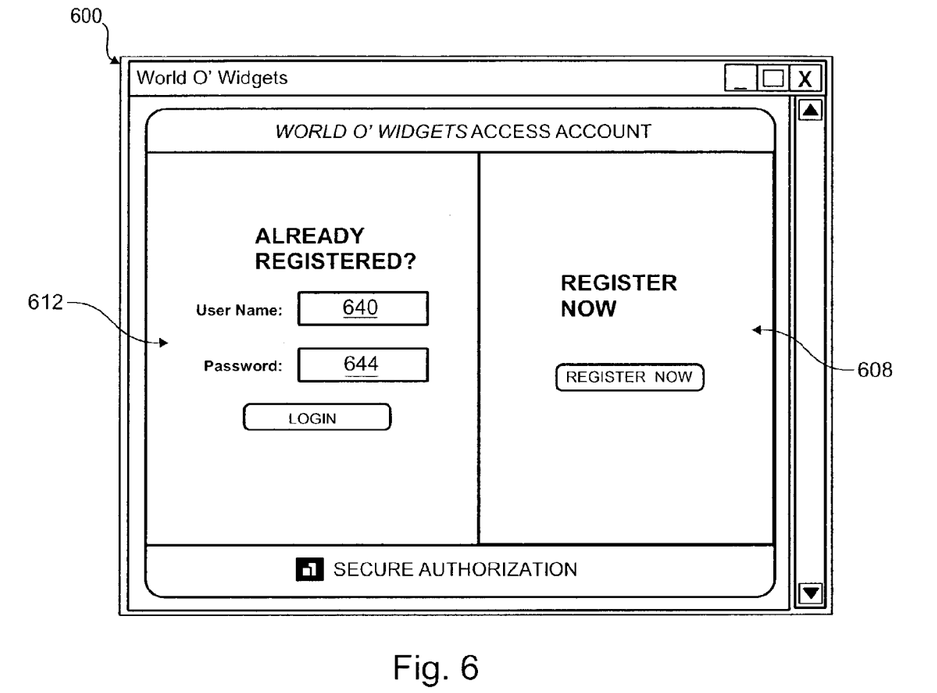
FIG. 6 is a screen shot of an embodiment of an authentication screen for a transaction.

With reference to FIG. 6, a screen shot of an embodiment of an authorization screen 600 is shown. In this embodiment, the user 110 accesses the online merchant 155 across a network. A similar screen 600 could be presented at a retail merchant 150 for in-store purchases. The checkout screen 600 could be activated at some point in the checkout process with the online merchant 155. The checkout screen 600 is typically, but not necessarily, in a window that overlays the window associated with the merchant such that when closed, the merchant's window is revealed.

The authentication is performed by the merchant 155 in this embodiment before the stored token can be used to clear payment. Some embodiments could use the payment enabler to authenticate the identity of the user 110 before indicating to the merchant 155 that the user is authenticated.

The checkout screen presents a login portion 612 and a new account portion 608. Existing account holders enter their user name 640 and password 644 to authenticate their identity and login. A user 110 without an account uses the new account portion 608 to begin a registration process where handler, authentication and demographic information are entered.

Some embodiments of the authentication screen 600 could have a way to link their account with the merchant to an existing account with the payment enabler 170. A button could be provided to link to a login screen that allows entry of username and password. Tokens issued to the merchant 150, 155 of a linked account could include an unique identifier assigned by the payment enabler 170.

Figure 7:
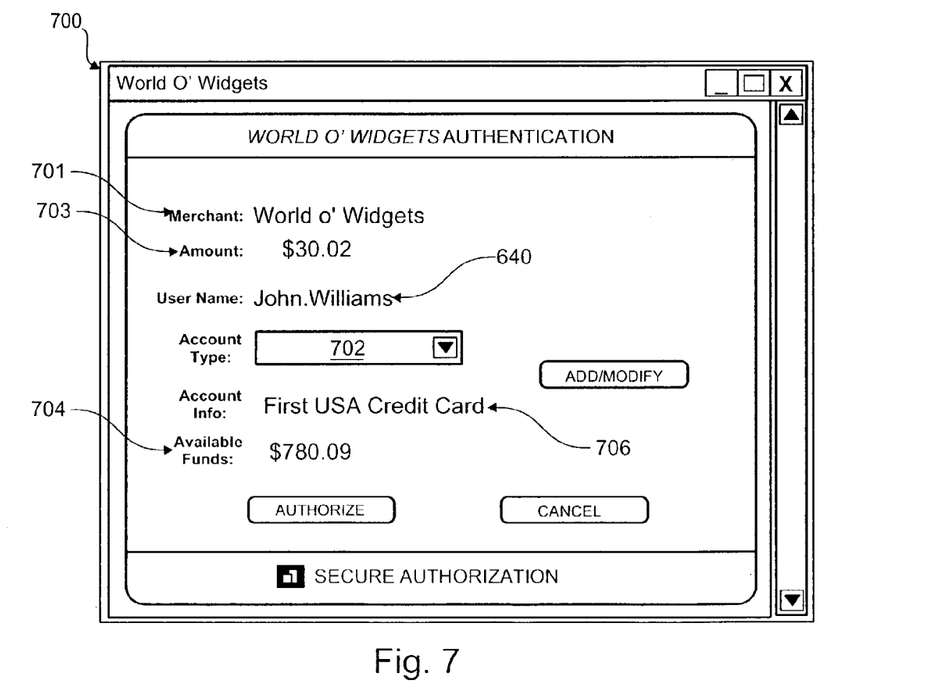
FIG. 7 is a screen shot of an embodiment of an authorization screen for a purchase.

With reference to FIG. 7, is a screen shot of an embodiment of an authorization screen 700 for an online purchase is shown. Once the user 110 has authenticated their identity in any of the various ways described above, the authorization screen 700 can be presented with an authenticated user name 640. The merchant name 701 is shown along with the amount 703 of the transaction. Some embodiments could itemize the items being purchased along with tax, shipping, etc. on the authorization screen 700. These line items are passed by the merchant 150, 155 to the payment enabler 170 for possible inclusion in the authorization screen 700. In some embodiments, the merchant 155 could formulate the authorization screen 700 and inform the payment enabler 170 of the outcome of the authorization request.

The user 110 may only have one account registered with the payment enabler 170 or be otherwise limited to one account during checkout. Where more than one account is possible, an account pull-down field 702 allows selection of those different accounts. The user 110 can optionally add or modify accounts. For a selected account, account information 706 and an available funds field 704 is populated. For different money handlers 160, this field 704 has a slightly different meaning. For a credit card, the available funds field is the available credit 704 before reaching any credit limit. The cash balance of a bank account is the available funds field 704 were the bank handler 160-5 or a debit card handler 160-3 is selected. For a gift certificate handler 160-6 or promotion handler 160-1, the available funds 704 is the remainder of the credit or point-equivalent credit remaining in that account. If the stored value fund with the payment enabler 170 is selected, that balance is used as the available funds field 704.

Figure 8:
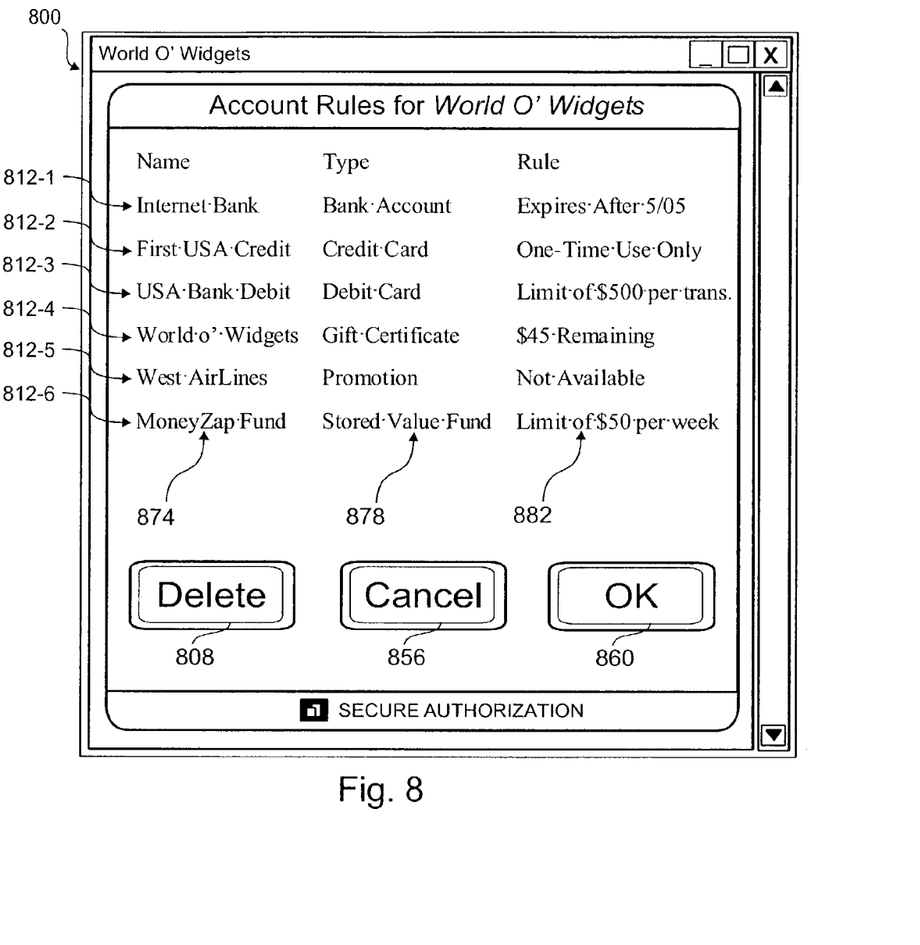
FIG. 8 is a screen shot of an embodiment of an account rule screen is shown that allow defining rules for various accounts of the user.

Referring next to FIG. 8, a screen shot of an embodiment of an account rule screen 800 is shown that allows defining rules for various accounts of the user 110. The account rule screen 800 is formulated by the payment enabler 170 in this embodiment, but could be branded consistently with the merchant 150, 155. The rules could be defined for all merchants or for a particular merchant only. The depicted embodiment shows a screen for defining rules for a particular merchant, namely, World O' Widgets. There could be a single token for the merchant or tokens for each of the available accounts.

This embodiment shows eight account entries 812. Each entry has an account name 874, a money handler type 878 and an optional rule 882. Where there is no rule, the token given to the merchant 150, 155 would never expire without intervention. The user can select any account entry 812 and deactivate the token by activating the delete button 808. The merchant 150, 155 could be notified by the payment enabler 170 that the account were no longer available. If that token were later presented, the payment enabler would reject it and notify the merchant 150, 155 accordingly.

Once the rules are defined, the user can approve the modifications with the OK button 860 or discard the changes with the cancel button 856. Changes are stored in the user database 324. Any changes could result in new tokens being issued for the affected merchants 150, 150 and/or accounts. The replaced tokens would no longer be accepted by the payment enabler 170.

Figure 9:
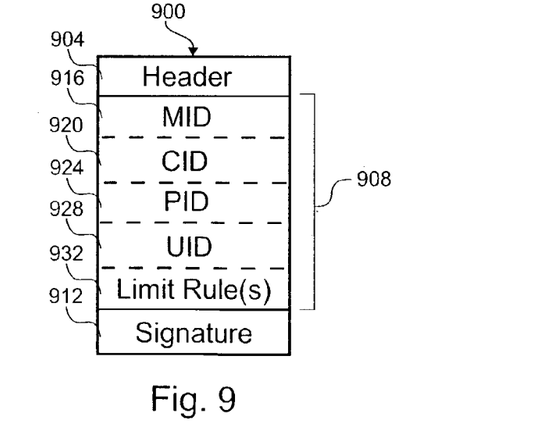
FIG. 9 is a data structure of an embodiment of a token.

With reference to FIG. 9, a data structure of an embodiment of a token 900 is shown. This embodiment includes a header 904, a body 908 and a signature 912. Each token is unique to a user 110 and an merchant 150, 155. During presentment of a token, the merchant 150, 155 authenticates their identity. Tokens issued to one merchant cannot be used by another merchant. The merchant 150, 155 is trusted to present the token only when the user has authorized payment.

In this embodiment, the header identifies the file as a token and could include revision information for the token so that the payment enabler 170 could properly decode the token. The payment enabler 170 creates the signature when producing the token. Some embodiments could use certificates instead of signatures. Various versions of tokens could be differentiated with the token information. The signature is used to verify the integrity of the header 904 and body 908. Tampering with the clear-text header 904 or body 908 could be detect by checking the signature. In this embodiment, a DSA algorithm with 512 bit keying is used for the signature, but other embodiments could use other algorithms and keying. Private or public keying could be used for the signature.

The body includes a merchant identifier (MID) 916, a customer identifier (CID) 920, a payment identifier (PID) 924, an optional user identifier (UID) 928, and limit rules 932. The MID 916 uniquely identifies all the merchants 150, 155 that use the payment enabler 170. To authenticate a connection, the merchant 150, 155 originating the connection is checked against the MID 916. The CID is the account number assigned to the user 110 by the merchant 150, 155. Each customer of the merchant 150, 155 should have a unique CID 920 assigned to each customer. With respect to the payment enabler 170, there could be duplicate CIDs 920 from various merchants, but no single merchant should have two or more users having the same CID 920. In this embodiment, the merchant 150, 155 can assign the CID 920 without consulting the payment enabler 170.

Various handler accounts are identified by the PID 924 for those embodiments that identify the account with the token 900. Some embodiments could hold a code in the PID field 924, such as all zeros, to signify that all accounts are available with that token. The merchant 150, 155 would separately specify to the payment enabler 170 the account to use for a particular purchase. If a merchant has a single token for all accounts, revoking the token prevents the merchant from any charges to any account of the user 110. Rules could limit the accounts available where a number are specified. For example, all accounts except the gift certificate account could be specified. Where there are a number of tokens that denote different accounts with the PID 924, the user 10 can revoke individual tokens to selectively prevent the merchant from using some accounts.

This embodiment includes a UID field 928 that holds a code uniquely identifying the user 110 to the payment enabler 170. No two users 110 of the payment enabler 170 have the same UID 928. The UID field 928 can be blank or omitted where the MID 916 and CID 920 are used to identify the user 110. In this embodiment, the UID field 928 is used where a user 110 has configured a login account with the payment enabler 170 or where accounts with two merchants 150, 155 are correlated to the same user 10. The UID 928 could be the user name 640 that is entered during the login process.

Restrictions can be placed upon use of the token in the limit rules field 932. Temporal, monetary and/or goods limits can be specified in this field. The token could be issued to another by the user 110 to a third party. The user 10 could specify how the third party could use the payment enabler 170 to charge handler account of the user 110 using that token. For example, a parent could issue a token to their child in college for use at the university stores for books only. The token could be limited to a single transaction such that after all items are shipped and redeemed, the token is no longer usable.

In some cases, the user 110 may want to limit the risk that the merchant will improperly charge their handler account. Absolute money limits, charges over a time period, or an expiration date could be specified to limit the merchant. For example, only $100 per month could be charged by a long distance phone company using a particular token, Where the token is usable at a number of merchants and/or departments of merchants, the rules field 932 could limit usage of the token within that group of merchants and/or departments. For example, all ACME department stores could use the token except store 112 or the sporting goods department in all stores.

Limitations on the types of goods could be added to the rules field 932. A particular SKU, brand, product type, or price thresholds could be regulated in this field. These limitations could be applied across all merchants or just against a specific merchant. For example, products over $500 could be excluded from ABC Jewelers or alcohol from any merchant.

Although the header 904 and body 908 of this embodiment is in the clear, some embodiments could encrypt this information to protect it from specific parties such as the payment enabler 170, the user 110 and/or the merchant 150, 155. Parties capable of decoding the information would have the appropriate public/private keys.

Some embodiments could include the handler account information in the token that is protected with encryption. Other information from the user database 324 could be moved into the tokens also. Information in the token may not be replicated in the user database 324.

Although the above embodiment has a separate token for each merchant 150, 155, some embodiments could have some or all merchants use a particular token. In that embodiment, a universal MID could be used that is valid for some or all merchants 150, 155. Revocation of the token 900 would be effective for all merchants associated with the MID.

In some embodiments, the MID could be excluded altogether such that a token were good for all merchants. Where there is no MID, a UID could be issued to each user that is unique to all users of the payment enabler 170. This token could be used at any merchant.

Where the token were for a particular money transfer, the token could include a transfer receiver identifier and, optionally, a transfer receiver identifier along with information to identify the payment account to draw from. The token could be presented by the transfer receiver for redemption from the payment account.

Figure 10A:
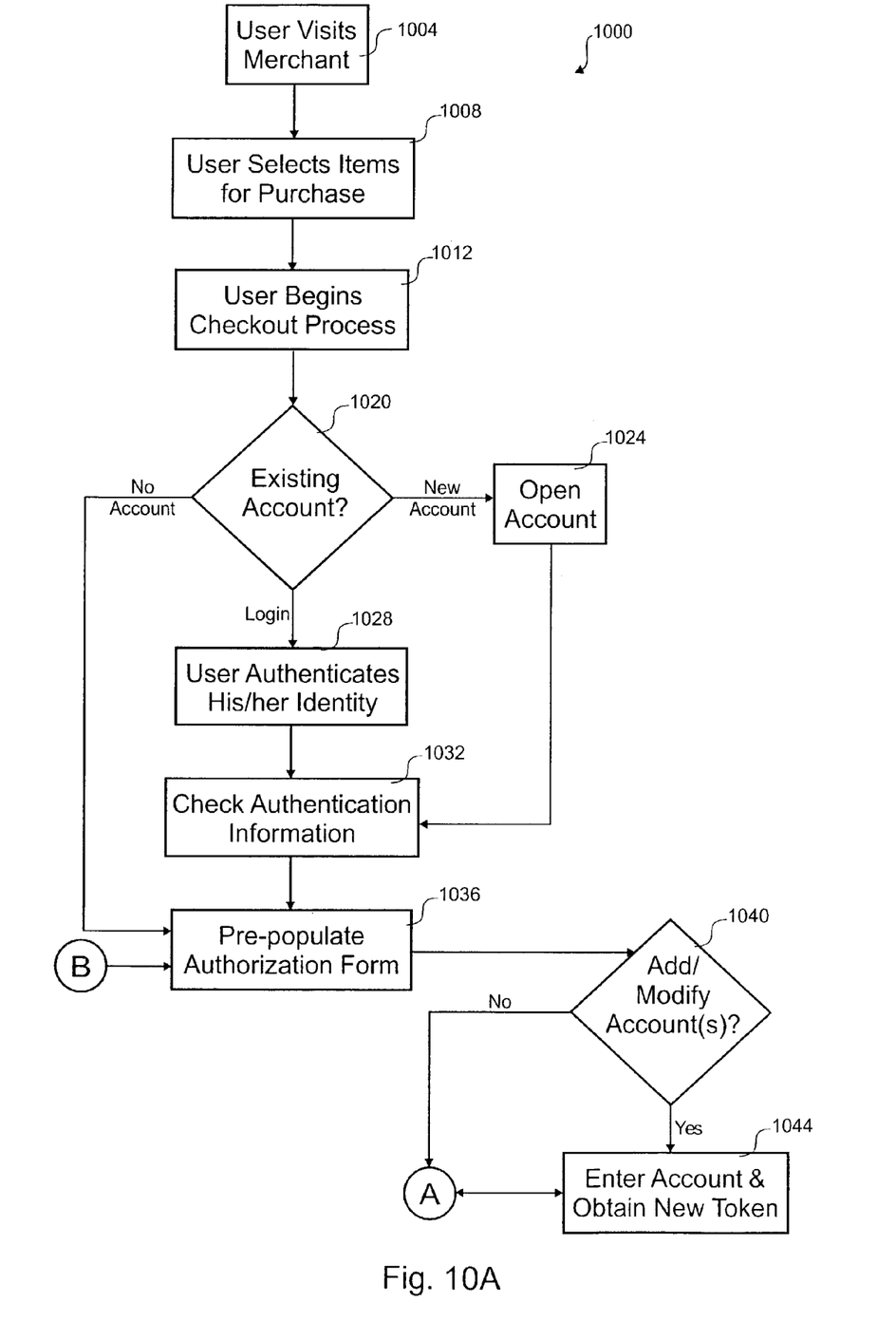
FIGS. 10A and 10B are a flow diagram of an embodiment of a process for performing a purchase.
Figure 10B:
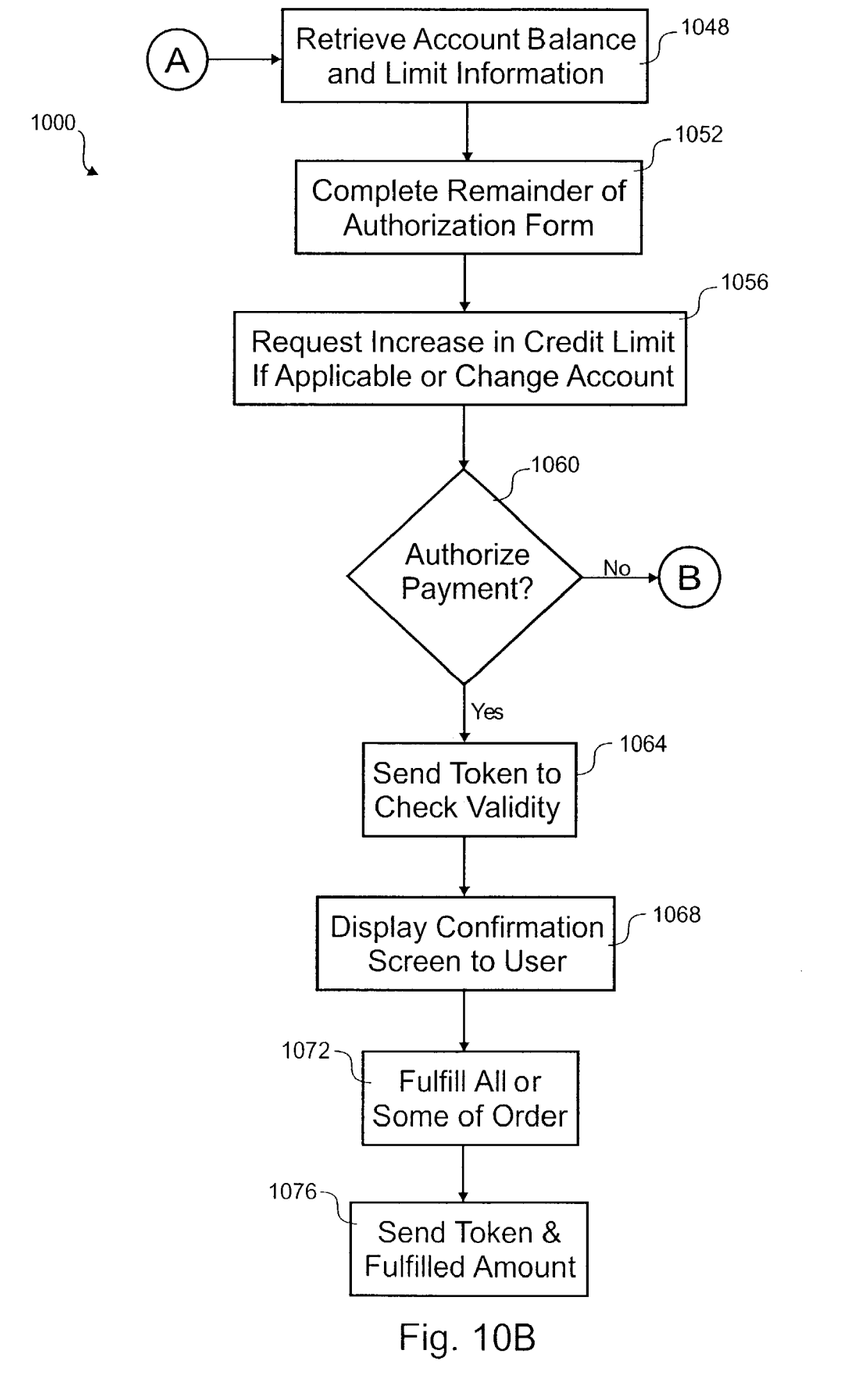

Referring next to FIGS. 10A and 10B, a flow diagram of an embodiment of a process 1000 for performing a purchase is shown. The depicted portion of the process 1000, begins in step 1004 where the user interacts with the merchant 150, 155 store online or in-person. Items are selected for purchase in step 1008. The electronic or manual checkout process is begun in step 1012.

In this embodiment, the user 110 need not open an account, but can open or access an account if so desired. In step 1020, it is determined what the user 110 wants to do. A new account can be opened in step 1024 before progressing to step 1032. Where no account is desired, processing continues to step 1036.

If the user 110 logs into an existing account, processing continues to step 1028 where the user 110 authenticates his or her identity. A username and password could be used and/or biometric authentication to verify identity with an authentication screen 600 in step 1032. The authorization screen 700 is pre-populated in step 1036. Either the merchant 150, 155 or the payment enabler 170 could formulate the authorization screen 700. Information is shared between the merchant 150, 155 and payment enabler 170. Account information is held by the payment enabler 170 and not the merchant 150, 155 in this embodiment. Any account information observed by the merchant 150, 155 is securely passed to the payment enabler 170.

In step 1040, the user 110 can decide to enter or modify account information. The user 110 interacts with the authorization screen 700 to add or modify account information in step 1044. For each new account, a token 900 is obtained for that account in this embodiment. Other embodiments, could have a single token that can charge any number of handlers 160. The payment enabler 170 gives the merchant permission to store the token 900 the merchant database 408 for use in the clearing process. Account information is not retained by the merchant 150, 155. Rather, the token 900 is retained.

The existence of a token 900 could be done without the user ever knowing of the token 900. In this scenario, the user would only know that the merchant 150, 155 would not have access to their account information and that only charges within the limitations previously defined could be performed. Where the token is stored on a storage media, the user simply uses the storage media much like other payment options such as a check or credit card.

Although this embodiment obtains the token for storage by the merchant as part of a checkout process, the invention is not so limited. The token could be created before the transaction. The user could log into the payment enabler 170 to define tokens and issue them to various merchants 150, 155. Issued tokens are passed to the relevant merchants. The user could be asked to associate any existing login account with the merchant to the token such that it is accessible upon login with the merchant. The tokens can also be modified and revoked from the payment enabler 170.

Further, the token could be stored on the user computer or a storage media such as a smart card, magnetic stripe, bar code, non-volatile memory, etc. The user could have a smart card issued that includes a token that can be read by POS terminals, for example. The smart card could be mailed to the user or made available for pick-up. The token in the storage media could be presented anywhere the storage media could be read.

Once the user 110 is satisfied with the account selected, processing continues to step 1048 of FIG. 10B where account balance and limit information is retrieved by the payment enabler 170 from the appropriate handler 160. In step 1052, the remainder of the authorization screen 700 is completed based upon the account selected. An increase in credit or alternative funding source can be requested in step 1056 where the current purchase would exceed any limit. Also, the user 110 could select another account with a different limit.

In step 1060, the user 110 decides to authorize the payment or not. Where the user 110 does not authorize payment, processing loops back to step 1036 where another account could be selected for funding the purchase. If the payment is authorized, processing passes to step 1064 where the token is sent to the payment enabler 170 to confirm its ongoing validity. The payment enabler 170 checks that the MID 916 of the token 900 corresponds to the merchant 150, 155 who sent the token to confirm the sender is not an imposter. A revocation list of tokens is maintained by the payment enabler 170. As users 110 revoke tokens and handlers 160 cancel accounts, the tokens are added to a revocation list. Each token is checked against the revocation list before honoring any transfer or pre-authorization.

Also, the merchant 150, 155 could confirm in step 1064 that the payment would not violate any rules 932 associated by the token 900. The merchant 150, 155 and/or the payment enabler 170 could check the rules 932. Further, the merchant 150, 155 could confirm that the rules 932 are unlikely to be violated when the payment is cleared. For example, the merchant 150, 155 could expect to ship the merchandise in a week such that a check would be make to confirm that the token will not expire in the next week. Some embodiments could protect the merchant 150, 155 from rule changes with purchases that were confirmed beforehand.

In step 1068, a confirmation screen is shown to the user 110. This screen could include invoice information that identifies the account that will fund the purchase along with other conventional information. In step 1072, all or part of the order is fulfilled. The token along with an amount to redeem are submitted to the file interface 180-6 in step 1076. The payment enabler 170 checks the rules 932 for unauthorized charges and clears the payment to the merchant 150, 155. The payment could be transferred out of the payment enabler 170 using a money handler 160 or could be held in a stored value fund of the merchant 150, 155.

The submission of tokens could be done by a merchant 150, 155 in batch at a time after the checkout process has completed. A file could include a number of transactions for redemption according to some time schedule or after some order quantity or monetary threshold. Each transaction would include a token and transfer amount. The payment enabler 170 would clear these charges individually. Another file could be provided to the merchant 150, 155 with clearing status for the various active transactions with that merchant 150, 155.

While the principles of the invention have been described above in connection with specific apparatuses and methods, it is to be clearly understood that this description is made only by way of example and not as limitation on the scope of the invention.

What is claimed is:

1. A method for a payor paying a merchant using a payment system, the method comprising:

using a payment enabler having a computer processor and a database to receive account information that is usable to receive funds from a money handler in order to pay for the purchase an item from a merchant, the account information received from the payor, wherein the account information identifies an account of the payor, wherein the account information includes an account number of the payor;

generating a token using the processor of the payment enabler, wherein the token comprises an electronic data file having a user identifier that identifies the payor but does not include the account number, and a merchant identifier that identifies the merchant;

the payment enabler issuing the token to the merchant;

the payment enabler receiving the token back from the merchant when the payor confirms that the item is to be purchased from the merchant;

the payment enabler authenticating that the token was presented by the merchant by using the processor to check that the merchant identifier from the received token is the same as that previously transmitted from the payment enabler to the merchant; and transferring the payment from the payor to the merchant with the payment system.

2. The method for the payor paying the merchant using the payment system as recited in claim 1, further comprising a step of determining if the token has violated one or more of the rules associated with the token.

3. The method for the payor paying the merchant using the payment system as recited in claim 1, wherein the token comprises one or more rules that regulate use of the token.

4. The method for the payor paying the merchant using the payment system as recited in claim 1, wherein the token comprises a code that can be analyzed by the computer processor of the payment enabler to determine if information in the token has been modified.

5. The method for the payor paying the merchant using the payment system as recited in claim 1, further comprising receiving at the payment enabler a request from the payor to revoke the token.

6. The method for the payor paying the merchant using the payment system as recited in claim 1, wherein the token is retained by the merchant for use in future transactions between the payor and the merchant.

7. The method for the payor paying the merchant using the payment system as recited in claim 1, wherein the token can only be used by the merchant to the exclusion of other merchants.

8. The method for the payor paying the merchant using the payment system as recited in claim 1, further comprising the payor selecting the item from a web site of the merchant prior to contacting the payment enabler.

9. The method for the payor paying the merchant using the payment system as recited in claim 8, further comprising the payor proceeding to a check out display screen, wherein the display screen includes login information to access the payment enabler.

10. The method for the payor paying the merchant using the payment system as recited in claim 9, wherein the login information includes fields for entering a user name and password, and further comprising receiving at the payment enabler the user name and password and authenticating the payor based on the user name and password.

11. The method for the payor paying the merchant using the payment system as recited in claim 1, further comprising the payment enabler comparing the token from the merchant with a list of revoked tokens stored in the database.

12. The method for the payor paying the merchant using the payment system as recited in claim 1, further comprising the payment enabler transmitting confirmation information to the payor that payment has been effectuated.

* * * * *